United States Patent [19]

Condarco et al.

[11] 4,109,875
[45] Aug. 29, 1978

[54] MODULE FEEDING APPARATUS

[75] Inventors: Jose G. Condarco; John E. McClesky; Pedro Condarco, all of Gaines County, Tex.; Charles V. Brown, New York, N.Y.

[73] Assignee: Continental Conveyor and Equipment Company, Sherman, Tex.

[21] Appl. No.: 697,938

[22] Filed: Jun. 21, 1976

[51] Int. Cl.[2] .......................................... B02C 13/286
[52] U.S. Cl. .............................. 241/101.7; 241/189 R; 241/191; 241/223
[58] Field of Search ............ 241/101 A, 101.7, 189 R, 241/189 A, 191, 223, 235; 214/10

[56] References Cited

U.S. PATENT DOCUMENTS

| 3,298,494 | 1/1967 | Pfeilschifter | 214/10 X |
|---|---|---|---|
| 3,656,641 | 4/1972 | Smits | 214/10 X |
| 3,863,850 | 2/1975 | Freeman | 241/223 X |
| 3,897,018 | 7/1975 | Wilkes et al. | 241/223 |
| 3,923,257 | 12/1975 | Reber | 241/101.7 |
| 3,985,305 | 10/1976 | Williamson et al. | 241/101.7 |
| 4,031,003 | 6/1977 | Husky | 241/101 A X |

*Primary Examiner*—Howard N. Goldberg
*Attorney, Agent, or Firm*—Bertram H. Mann

[57] ABSTRACT

Module reclaim apparatus comprising a housing open at the bottom and an end and movable over a stack of seed cotton or other fibrous modules. The housing carries a descending series of pronged feeder rollers near one end which release fibers from the adjacent end of the module and throw same onto a transversely traveling conveyor for ultimate delivery, for instance, to the gin equipment. A rotary sweeper returns escaped fibers to the feeder rollers and a novel jacking system provides for adjusting the vertical positioning and levelling of the housing. A door at the forward end of the housing moves against the rear end of the module when the fibrous remnant is too thin to be self-supporting.

5 Claims, 7 Drawing Figures

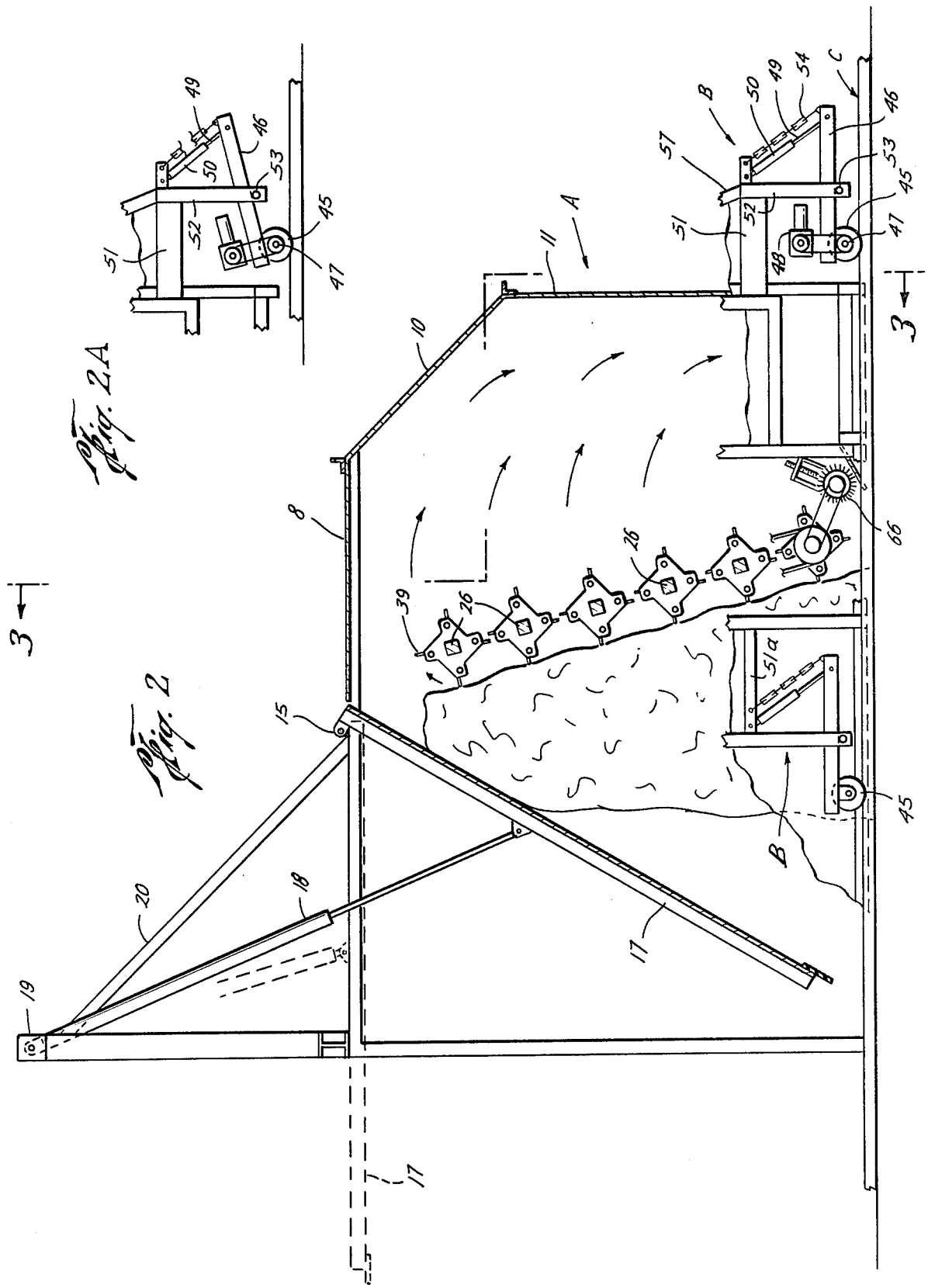

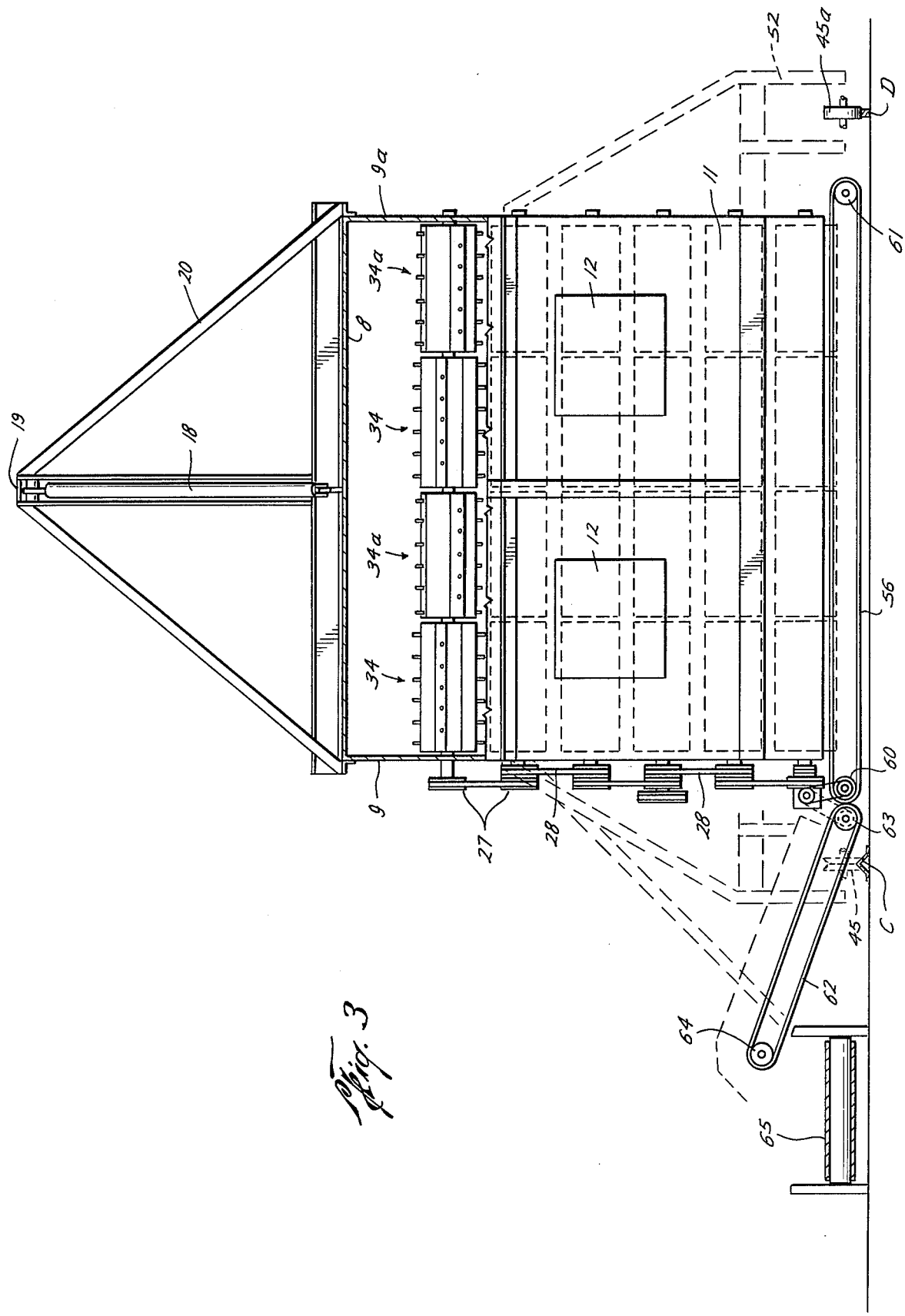

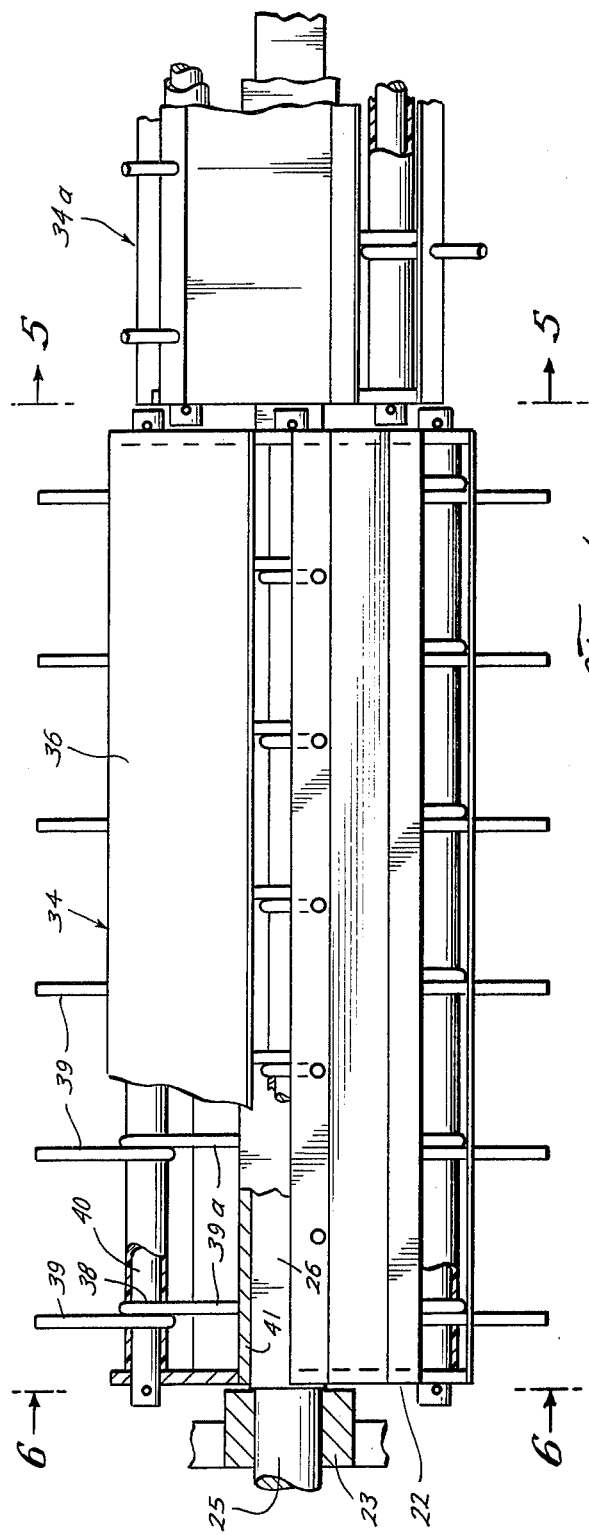
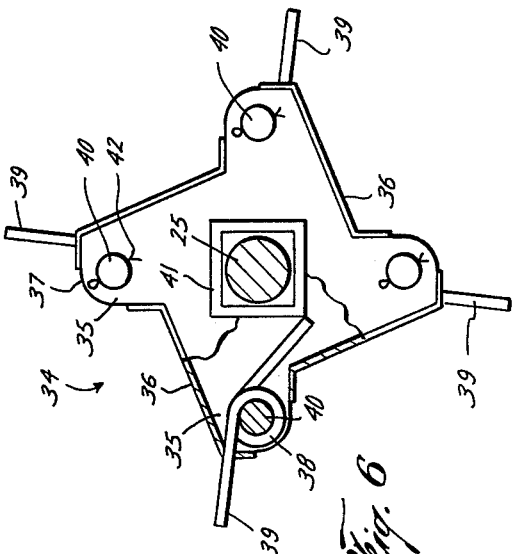
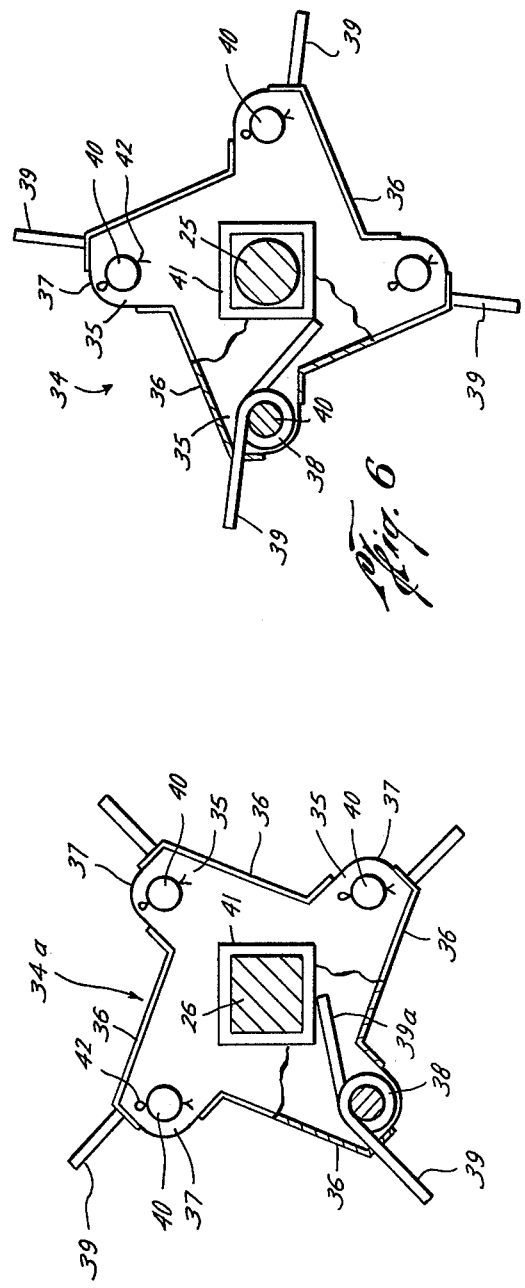

MODULE FEEDING APPARATUS

BACKGROUND OF THE INVENTION

Wilkes et al U.S. Pat. No. 3,897,018 discloses a module dispenser consisting of a stationary housing into which the modules are moved on conveyors. This arrangement has disadvantages, for instance, the substantial expense and power requirement of the module conveying system and the continuous exposure of the apparatus to weather conditions.

SUMMARY OF THE INVENTION

It is an object of this invention to provide feeding apparatus for fibrous bales, and the like, hereinafter sometimes called modules which apparatus is movable over stacked modules, thus eliminating the module conveyor feature of the Wilkes patent.

Another object is to provide novel elevating and levelling means for such apparatus.

Another object is to provide means for supporting the remnant end of the module being closely approached by the feed rollers.

In accordance with the present invention, an open-bottom housing is mounted on rails, through the intermediary of hydraulic, self-elevating leverage systems. The housing is powered to move along the rails to encompass one or more modules bales, or the like stacked between the rails. Pronged feed rollers near the rear or inner end of the housing work against the adjacent end of the module to dislodge the fibers and throw them upon a transversely moving conveyor belt for conduct to other conveyor means and, ultimately, to the cleansers, dryers, and other gin equipment. As the distal end of the module approaches the feed rollers, a door drops there against to support the remnant of the module. A sweeper roller picks up fibers which miss the transverse conveyor and returns them to the feeder rollers. Novel means is provided for quickly and inexpensively renewing the resilient prongs on the feed rollers.

BRIEF DESCRIPTION OF THE DRAWINGS

In the accompanying drawings

FIG. 2 is a vertical longitudinal center section through the apparatus, parts being shown in elevation.

FIG. 2A is a view of the self-elevating detail in a different position.

FIG. 3 is an end view of the apparatus, parts being omitted for clarity.

FIG. 4 is an enlarged transverse section showing parts of the feed rollers, portions being broken away.

FIGS. 5 and 6 are detail sections taken on the corresponding section lines of FIG. 4, parts being broken away.

DETAIL DESCRIPTION OF THE DRAWINGS

Figure 1:
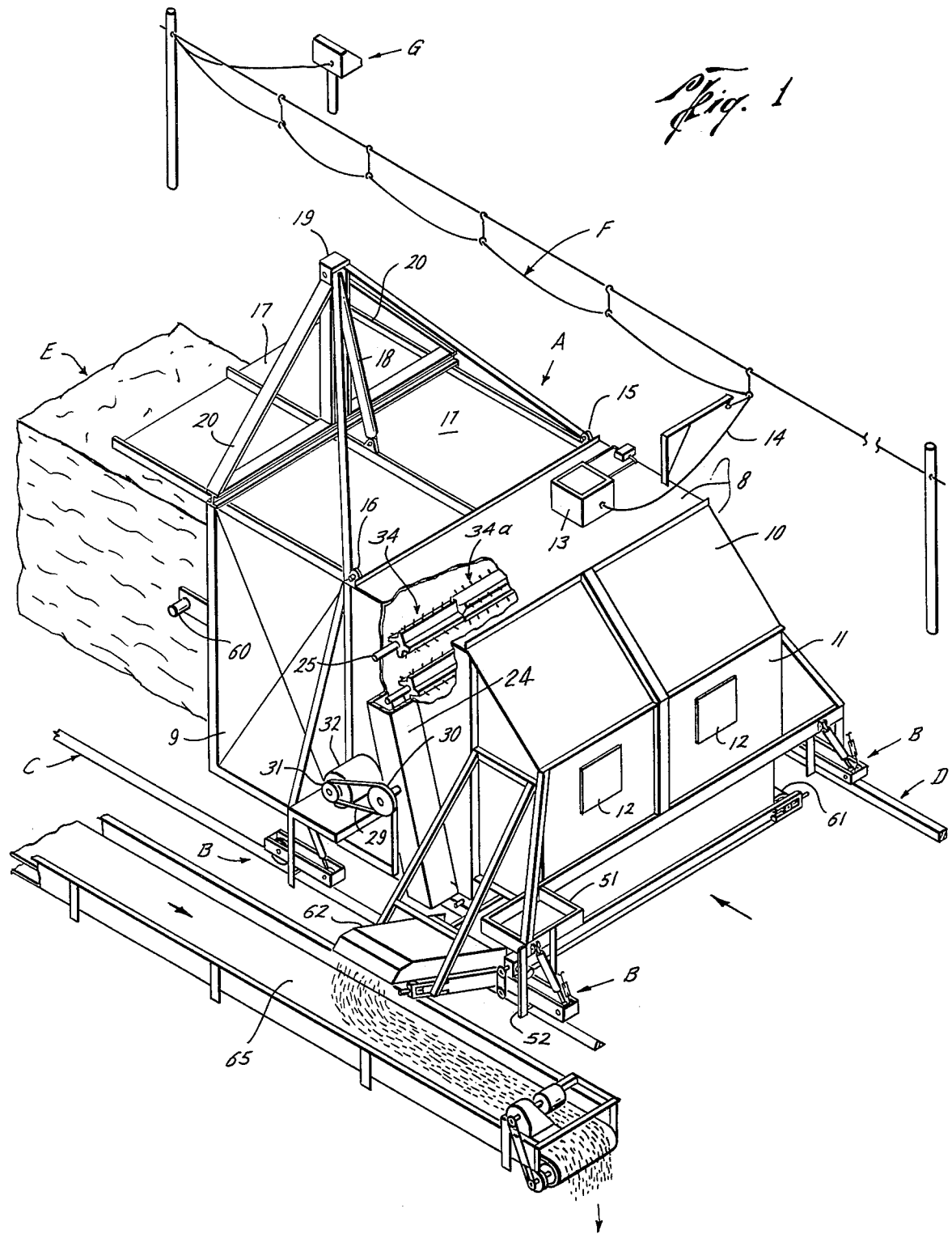
FIG. 1 is an isometric view of the novel module feeding apparatus, a part being broken away to show underlying structure.

The apparatus consists of a housing A supported through the intermediary of four, substantially identical roller-equipped leverage jacking devices B upon rails C and D for movement over and along stacked modules E, as of compressed seed cotton. A power line F connects the control console G with the apparatus.

The main housing A consists of a top enclosure 8, side walls 9 and 9a, and an end wall including an inclined upper portion 10 and a vertical lower portion 11 with inspection windows 12, all braced by suitable ribbing and framing. The main housing A is open at the front end and bottom for receiving and straddling the modules E. Mounted on top 8 is hydraulic pressuring system 13 connected by a wire 14 to the power line F. Pivoted at 15 and 16 to the forward edge of top 8 is the module back-up door 17 for a purpose to be described hereafter. The door is operated by a hydraulic cylinder 18 depending from apex 19 of converging support bars 20.

Extending along each side wall 9 and 9a rearwardly of back-up door 17 (FIG.4) are parallel inclined beams 22 (FIG. 4) carrying journal bearings 23 within similarly inclined sub-housings 24 (FIG. 1).

Seated in these bearings are the journal portions 25 of six cross shafts 26, each having a sheave wheel 27 at its left end (FIGS. 2 and 3). All of the sheave wheels are driven by an electric motor 32 through belts 28 and 29 and additional sheave wheels 30 and 31.

Axially slidable but non-rotatable on the intermediate portion of each cross shaft 26 are a plurality of breaker-feeder bodies 34, 34a each having four lobes, as 35, arranged in quadrature (FIGS. 5 and 6). The bodies 34, 34a are separated by rectangular spacers 41 loosely received on the shafts. The bodies are of hollow construction with edge walls 36 forming openings 37 for admission into the interior of the body of coiled springs 38, each with end projections 39 and 39a. Corresponding lobes 35 of each body 34, 34a are aligned in the assembly and perforated to receive rods 40 which extend through and support the intermediate coils of springs 38. As assembled, the inner ends 39a of the springs bear against the shaft spacers 41 and the outer ends 39 project approximately radially through openings 37 for engaging the module to remove material therefrom, as will be explained. The rods 40 are held in place by cotter pins 42 which are easily removable for withdrawal of rods 40 and release of the breaker springs 38 for repair or replacement, without removal of the main shaft 26 or spacers 41. In order to facilitate this replacement process, alternate ones 34, 34a of the breaker-feeder bodies are circumferentially staggered so that any of the rods 40 and its supported springs may be independently removed.

The apparatus is mounted on rails C and D through wheels 45 and 45a and hydraulic levelling devices B (FIGS. 2 and 2A). One rail C and the corresponding wheels 45 are V-shaped for lateral stability, while the other rail D and its wheels have flat engaging surfaces to accomodate slight variation in the rail gauge. Since the self-elevating devices are identical only one need be described. A horizontally disposed narrow, rectangular box 46 has end bearings receiving stub shaft 47 on the corresponding support wheel 45. The two elevating devices B on the V-grooved wheels 45 are equipped with hydraulic motor combinations 48 for driving the apparatus along the rails. At the opposite end of lever forming box 46 there is pivotally connected the piston rod 49 of a hydraulic motor 50, the upper end of which is pivoted to a longitudinal member 51 or 51a rigid with main housing A. A stirrup, including side members 52 and cross pin 53 intermediately fulcrums the lever forming box 46 to provide the differential action for raising or lowering the main housing on the tracks, respectively, when motor 50 is energized. A safety chain 54 limits the dropping of the housing. FIG. 2A shows the parts in the housing elevating position. The members 51 mounting these elevating devices at the rear end of the housing are box-like as shown in FIG. 1, and project rearwardly from housing end wall 11 to clear the transverse conveyor 56, to be described. Members 51 are braced, as at 57.

In order to control back-up door 17, an electric eye mechanism 60 may be mounted in the forward ends of housing side walls 9 so that when the beam clears the module being fed, hydraulic cylinder 18 extends to lower the door, as indicated in FIG. 2. Suitable electrohydraulic controls will be provided for fully automatic or semi-automatic control, as will be understood by those skilled in the control field.

At the rear end of the main housing, adjacent the bottom edge of end wall 11, there is a transverse, endless belt conveyor 56 extending from powered pulleys 60 at the left side (FIG. 3) to the take-up pulley 61 at the opposite side. The left end of the belt discharges upon the inclined conveyor belt 62 on powered and adjustable pulleys 63 and 64. The conveyed material is dumped onto a conveyor 65 for transport to the gin house. Between the transverse conveyor belt and the lowermost rotary feeder bodies 34, 34a there is a rubber flighted, powered sweeper roller 66 which rotates clockwise to return material which misses the belt 56 to the feeder bodies to be repropelled toward end wall 11 and belt 56.

OPERATION

With the hydraulic system powered, door 17 elevated, feeder bodies rotating clockwise, and the apparatus properly elevated and levelled, left side roller wheels 45 are powered to move the apparatus toward and over a stack of modules E between the rails. When the rotating feeder bodies engage the end of the module, material is released from the module and propelled by prongs 39 upon transverse conveyor belt 56, thence to the sequential conveyors 62 and 65. As the feeder bodies eat through the module, the forward end thereof ultimately is passed by the electric eye beam and door 17 is dropped against the front end of the module remnant now reduced in thickness, as suggested in FIG. 2. This has the effect of supporting the remaining material for handling by the feeder bodies. When the module is entirely consumed, the door may be lifted automatically, as by timing mechanism, or manually. During the feeding process, the ground or pavement will be kept clean by sweeper 66.

In order to renew the fiber release springs 38–40, the appropriate cotter pin 42 and rod 40 are removed, permitting the worn or damaged spring to be withdrawn and replaced through the opening 37.

Various modifications may be made as will occur to those skilled in the art and exclusive use of all modifications as come within the scope of the accompanying claims is contemplated.

We claim:

1. Apparatus for releasing fibrous material from modules, bales, or the like thereof comprising movably mounted framing with transversely spaced transport elements, a top member, a plurality of powered, rotary fiber release bodies depending below said top member, means for transporting the apparatus against and through a module in its path to cause said bodies to progressively remove fibers from said module, a module back-up member normally carried by said top member in position to clear said module, and means to shift said back-up member against the end of said module opposite said release bodies, as said bodies approach said end, to support the module remnant.

2. Apparatus as described in claim 1 in which said back-up member is formed as a door pivoted to said framing top member.

3. Apparatus as described in claim 1 in which said framing has transversely spaced transport elements and further including jacking means interposed between said framing and said transport elements for adjusting the height of and levelling said framing.

4. Apparatus as described in claim 3 in which said transport elements are wheels mounted on under parts of said framing.

5. Apparatus as described in claim 3 in which said jacking means comprises a lever supported at one end portion on the corresponding transport element, a powered, expansible and contractible link connecting the opposite end portion of said lever to said framing above said lever, and a stirrup intermediately underlying said link and depending from said framing above said lever for selectively elevating and lowering said framing relative to said transport element.

* * * * *